(12) United States Patent
Ito et al.

(10) Patent No.: US 6,320,683 B1
(45) Date of Patent: Nov. 20, 2001

(54) OPTICAL INFORMATION RECORDING AND REPRODUCING APPARATUS USING A VOLUME HOLOGRAPHIC MEMORY

(75) Inventors: Yoshihisa Ito; Tomomitsu Kouno; Hideki Hatano; Takashi Yamaji; Satoru Tanaka; Hajime Matsushita, all of Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/538,154

(22) Filed: Mar. 29, 2000

(30) Foreign Application Priority Data

Mar. 30, 1999 (JP) .................................... 11-088414

(51) Int. Cl.⁷ ..................................................... G03H 1/26
(52) U.S. Cl. ................... 359/22; 359/7; 359/29; 365/126; 369/103
(58) Field of Search ................... 359/3, 4, 7, 10, 359/21, 22, 28, 29, 30; 365/125, 216; 369/103

(56) References Cited

U.S. PATENT DOCUMENTS 5,665,493 * 9/1997 Bai et al. ................................. 359/7
5,847,851 * 12/1998 Wechsler et al. ....................... 359/7

FOREIGN PATENT DOCUMENTS 5-142979    6/1993    (JP) .
10-97174    4/1998    (JP) .

* cited by examiner

Primary Examiner—Darren Schuberg
(74) Attorney, Agent, or Firm—Finnegan, Henderson, Farabow, Garrett & Dunner, L.L.P.

(57) ABSTRACT

A description is provided of an optical information recording and reproducing apparatus which detachably supports a volume holographic memory formed of a photorefractive crystal. The apparatus includes a portion for supplying a coherent reference light beam at a first wavelength into the volume holographic memory; a portion for supplying a coherent signal light beam at the first wavelength, modulated in accordance with image data, into the memory to produce an optical interference pattern with the reference light within the memory; a portion for supplying a gate light beam at a second wavelength into the memory for activating or deactivating an index grating in accordance with the presence or absence of the optical interference pattern to enhances a photo-sensitivity of the memory; and a detector for detecting diffraction light from the index grating of the memory by the irradiation of the reference light beam. The apparatus includes a scanning portion for moving an intersecting region in which the gate light beam, the signal light beam and the reference light beam intersect with one another within the volume holographic memory along an optical axis of an optical path of the signal light beam within the volume holographic memory.

9 Claims, 9 Drawing Sheets

OPTICAL INFORMATION RECORDING AND REPRODUCING APPARATUS USING A VOLUME HOLOGRAPHIC MEMORY

BACKGROUND OF THE INVENTION

1. Field of the Invention

The present invention relates to a volume holographic memory and an optical information recording and reproducing apparatus using the volume holographic memory.

2. Description of the Related Art

Conventionally, a holographic memory system is known as a digital recording system using the principle of holography. The holographic memory system records digital data on a memory medium made of a photorefractive crystalline such as lithium niobate ($LiNbO_3$) or the like, and reproduces the data from the same. The photorefractive effect is a phenomenon in such that electric charges generated by photo-excitation move within a crystal thereby to form a spatial electric field distribution, which combines with a primary electro-optical effect i.e., Pockels effect to change a refractive index distribution in the crystal. In a ferroelectric crystal or the like exhibiting the photo-refractive effect, its change of the refractive index is responsive even to a fine optical input pattern of 1,000 lines or more per one millimeter, and this effective action is generated at a response speed on the order of microseconds to seconds in real time, though the response speed varies depending on kinds of materials. Therefore, a variety of applications for such crystals has been studied as a real time hologram medium which does not require any developing. The holographic memory system is capable of recording and reproducing data on a two-dimensional plane page unit, and also performing a multiple recording with use of a plurality of the page units. The volume holographic memory is designed to enable three-dimensional recording with a crystal medium being of a three-dimensional shape such as a rectangular parallelepiped or the like. In the volume holographic memory, which is one type of Fourier transform holograms, data is recorded at every two-dimensional image page unit in a dispersed manner within a three-dimensional space of the volume holographic memory. In the following, the outline of the holographic memory system will be described with reference to FIG. 1.

Referring to FIG. 1, an encoder 25 translates digital data to be recorded in a volume holographic memory 1 into a dot pattern image consisting of light and dark spots arranged in a plane, and rearranges the image in a data arrangement, for example, a data array of 480 pixels in the vertical direction and 640 pixels in the horizontal direction to generate a unit page sequence data. The unitary page sequence data is supplied to a spatial light modulator (SLM) 12 including a panel of a transmission type Thin Film Transistor (TFT) liquid crystal display (hereinafter also called simply as "LCD").

The spatial light modulator 12 has a modulation unit for performing a modulation processing of 480 pixels in a line and 640 pixels in a row which corresponds to one unit page, and optically modulates a light beam into an on/off signal of spatial light in accordance with the unit page sequence data from the encoder 25, and guides the modulated light beam, i.e., signal light beam to a lens 13. More specifically, the spatial light modulator 12 passes therethrough the light beam in response to a logical value "1" of the unit page sequence data, which is an electric signal, and shuts off the light beam in response to a logical value "0" thereby to accomplish the electro-optical conversion in accordance with the contents of respective bits in the unit page data. Accordingly, the signal light beam including the unit page sequence is generated by modulation of the light beam.

The signal light beam is incident upon the volume holographic memory 1 through the lens 13. In addition to the signal light beam, a reference light beam is incident upon the volume holographic memory 1 at an angle $\beta$ (hereinafter, referred to as "incident angle $\beta$") relative to a predetermined baseline perpendicular to an optical path of the signal light beam.

Both the signal light beam and the reference light beams interfere with each other within the volume holographic memory 1, and the resulting interference fringes are stored as a refractive index grating within the volume holographic memory 1, whereby recording of data is effected. Also, when the volume holographic memory 1 is irradiated multiple times with the reference light beam at different incident angles $\beta$ to record a plurality of two-dimensional plane data in an angle multiplexing form, a recording of three-dimensional data can be accomplished.

When reproducing the recorded data from the volume holographic memory 1, only the reference light beam is introduced into the volume holographic memory 1 at the same incident angle $\beta$ as at the time of recording toward the center of a region in which the signal and reference light beams intersect with each other. In other words, the reproducing of the recorded data is different from the recording of the data in that the signal light beam is not introduced into the volume holographic memory 1. Therefore, the volume holographic memory 1 diffracts the reference light beam at the intersection of the refractive index grating caused by interference fringes. The diffracted light from the refractive index grating recorded in the volume holographic memory 1 is guided through a lens 21 to a photodetector such as a Charge Coupled Device (CCD) 22 on which a light and dark pattern image i.e., an image of the data arrangement is reproduced. The CCD 22 converts the received image into variations in intensity of an electric signal to output to a decoder 26 an analog electric signal having a level corresponding to a distribution of brightness in the incident image. The decoder 26 compares the analog electric signal with a predetermined amplitude i.e., a slice level to reproduce data consisting of the corresponding "1" and "0".

Since the volume holographic memory records two-dimensional plane data sequences as described above, angle multiplexing recording can be performed by changing the incident angle $\beta$ of the reference light beam. Specifically, a plurality of two-dimensional planes, i.e., the recorded units, can be defined within the volume holographic memory by changing the incident angle $\beta$ of the reference light beam. Consequently, three-dimensional recording can be carried out. Examples of angle multiplexing recording are described in Japanese Unexamined Patent Publications Kokai Nos. H5-142979 and H10-97174.

OBJECT AND SUMMARY OF THE INVENTION

It is therefore an object of the present invention to provide an optical information recording and reproducing apparatus which is capable of recording interference patterns in a volume holographic memory at a high density and capable of being miniaturized.

According to the present invention, there is provided an optical information recording/reproducing apparatus for recording data on a volume holographic memory formed of a photorefractive crystal and reproducing data from the volume holographic memory, said apparatus comprising:

a support portion for mountably supporting the volume holographic memory;

a reference light beam supplying portion for supplying a coherent reference light beam of a first wavelength into the volume holographic memory;

a signal light beam supplying portion for supplying a coherent signal light beam of the first wavelength which is modulated in accordance with image data, into the volume holographic memory such that said coherent signal light beam intersects with the reference light beam to produce a three-dimensional optical interference pattern with said reference and signal light beams;

a gate light beam supplying portion for supplying a gate light beam of a second wavelength into the volume holographic memory, the gate light beam enhancing a photo-sensitivity of the volume holographic memory for one of activating and deactivating of a refractive index grating in accordance with the presence or absence of said optical interference pattern;

a photo-detecting portion for detecting a diffracted light caused from the refractive index grating of the volume holographic memory by irradiation of the reference light beam; and a scanning portion for moving an intersecting region in which the gate light beam, the signal light beam and the reference light beam intersect with one another within the volume holographic memory along an optical axis of an optical path of the signal light beam within the volume holographic memory.

According to one aspect of the present invention, said scanning portion includes a first movable mirror positioned on an optical path of the reference light beam in said reference light beam supplying portion, said first movable mirror reflecting the reference light beam to move the reference light beam.

According to another aspect of the present invention, said first movable mirror is a mirror being displaceable in parallel or pivotally movable.

According to a further aspect of the present invention, said scanning portion includes a second movable mirror positioned on an optical path of the gate light beam in said gate light beam supplying portion, said second movable mirror reflecting the gate light beam to move the gate light beam.

According to still another aspect of the present invention, said second movable mirror is a mirror being displaceable in parallel or pivotally movable.

According to still another aspect of the present invention, said scanning portion includes a controller for synchronously moving the intersecting region in which the gate light beam and the reference light beam intersect with each other within the volume holographic memory along an optical path of the signal light beam within the volume holographic memory.

According to a still further aspect of the present invention, said gate light beam supplying portion includes a superluminescent diode.

According to still another aspect of the present invention, the volume holographic memory includes a cylindrical body made of a uniaxial crystal having an optical crystallographic axis in parallel with an axis of rotational symmetry, and said apparatus further comprises a scanning portion for moving the cylindrical body in a direction of the optical crystallographic axis, and for rotating the cylindrical body about the axis of rotational symmetry.

According to another aspect of the present invention, the volume holographic memory is a rectangular solid made of a uniaxial crystal having an optical crystallographic axis in parallel with one surface thereof, and said apparatus further comprises a moving portion for moving the volume holographic memory in parallel with respect to the signal light beam.

DETAILED DESCRIPTION OF THE PREFERRED EMBODIMENTS

Preferred embodiments according to the present invention of an optical information recording and reproducing apparatus will hereinafter be described with reference to the accompanying drawings.

Figure 1:
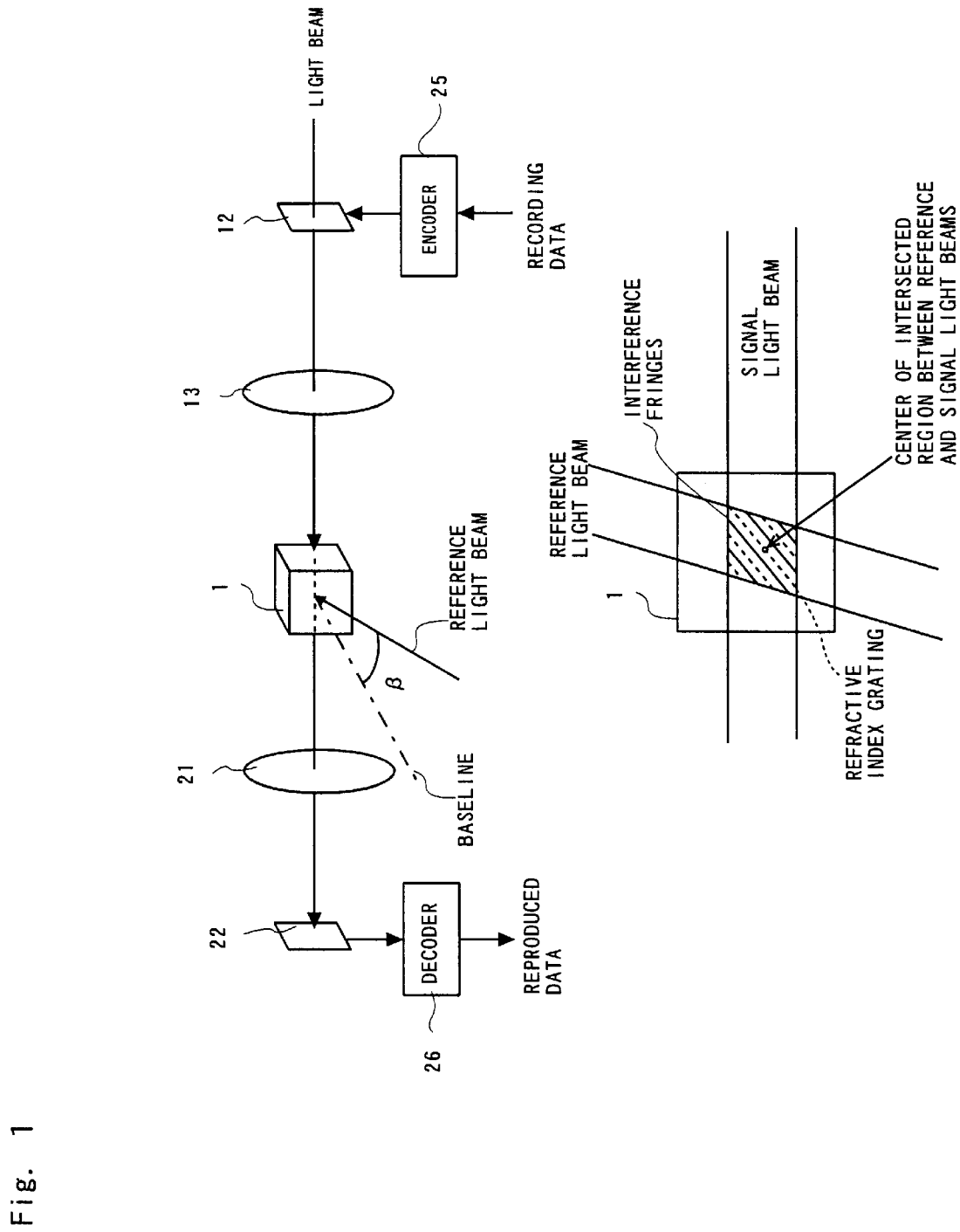
FIG. 1 is a diagram illustrating the structure of a conventional volume holographic memory system.
Figure 2:
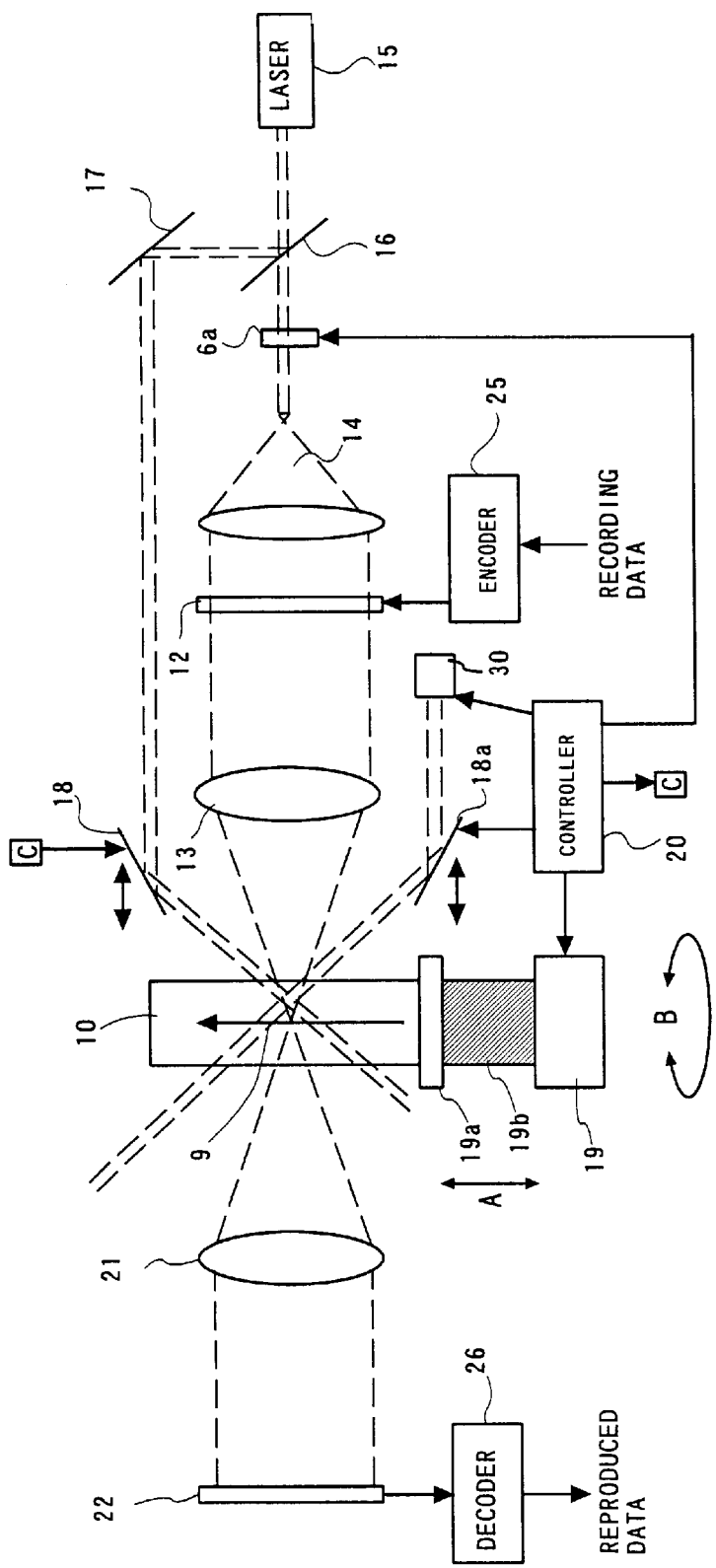
FIG. 2 is a side view illustrating the structure of another volume holographic memory system according to the present invention.

FIG. 2 illustrates a side view of an optical information recording and reproducing apparatus as one example.

At the time of recording, a beam splitter 16 splits a light beam emitted from a laser 15 into two, i.e., a source light beam which progresses straightly and a reference light beam which is deflected. The resultant light beams are guided to a signal light beam optical system and a reference light beam optical system, respectively.

In the signal light beam optical system, the source light beam having passed through the beam splitter 16 is incident onto a volume holographic memory 10 through a shutter 6a controlled by a controller, a light beam expander 14, a spatial light modulator 12 and a Fourier transform lens 13. The automatic shutter 6a limits a period of time, during which the source beam irradiates the volume holographic memory. The light beam expander 14 enlarges the source light beam into a parallel light beam having a predetermined diameter. The spatial light modulator 12 converts the source light beam from the beam expander 14 to a signal light beam in accordance with digital recording data supplied from an encoder 25. The spatial light modulator 12 is, for example, a two-dimensional plane LCD having 480 pixels in the vertical direction and 640 pixels in the horizontal direction (480×640). The source light beam is spatially modulated by the spatial light modulator 12 in accordance with recording page data, for example, through a two-dimensional lattice pattern, such as a diced or checkered like pattern, representing transmittance/non-transmittance of respective pixels, and then the signal light beam is subjected to Fourier transformation by the Fourier transform lens 13. The transformed signal light beam is converged by the lens 13 to pass toward the volume holographic memory 10 and provided into the volume holographic memory 10. In this embodiment, the lens 13 constitutes a Fourier transform system together with a lens 21 below. The volume holographic memory 10 having a cylindrical form is arranged so that a Fourier plane caused by the lens 13 is parallel with a symmetrical axis of rotation of the volume holographic memory 10. The volume holographic memory 10 of a photorefractive crystalline has a cylindrical body made of a uniaxial crystal, such as $LiNbO_3$ or the like, and an axis of the optical crystal is parallel to its rotational symmetry axis.

In the reference light beam optical system, the reference light beam is reflected by a mirror 17 and then by a movable mirror 18 to impinge on the volume holographic memory 10. Inside the volume holographic memory 10, the reference light beam intersects with the signal light beam supplied from the lens 13 to create three-dimensional interference fringes. It should be noted that the optical systems including the mirror 18, the lens 13 and so on are positioned in such a manner that the reference and signal light beams do not interfere just on the Fourier plane but in front of (or behind) the Fourier plane. A controller 20 controls the reflective movable mirror 18 with respect to the position so as to move in a direction parallel to the axis of the signal light beam.

The reflective movable mirror 18a is disposed near a lower side portion of the volume holographic memory 10 such that the gate light beam generated from a super-luminescent diode 30 for generating the gate light beam is incident at a predetermined angle onto the side surface of the memory 10. The reflective movable mirror 18a is driven parallel in a direction parallel to the axis of the signal light beam in the synchronized manner with the mirror 18 by controlling of the controller 20. The gate light beam includes a light component of a second wavelength which is different from the wavelength of the reference and signal light beams, and increases the photo-sensitivity of the volume holographic memory 10. The gate light beam activates or inactivates a refractive index grating in accordance with the presence or absence of a optical interference pattern within the volume holographic memory 10. Thus, the gate light beam also serves as an erasure light on the refractive index grating which is produced by the optical interference pattern. The super-luminescent diode 30, which serves as a gate light beam generating portion, is positioned to irradiate a gate light beam only to a limited region in which the signal and reference light beams intersect with each other within the volume holographic memory 10. The super-luminescent diode 30 is ON/OFF controlled by the controller 20. These optical systems are adapted in such a manner that the reference and signal light beams as well as the gate light beam intersect one another in a plane including a symmetrical axis of rotation of the cylindrical volume holographic memory or in a plane parallel to the plane including the rotational symmetry axis.

In this way, when data is recorded, the signal light beam, the reference light beam and the gate light beam are simultaneously irradiated to a predetermined site within the volume holographic memory 10 to record an interference pattern as an index grating having a refractive index variations. A period of time during which the hologram is formed is controlled by the automatic shutter for the laser light source.

In the case that a Fourier plane exists within the volume holographic memory, the signal light beam exhibits its maximum intensity on the Fourier plane. Therefore, when the reference light beam interferes with the zeroth light of the signal light beam having a high light intensity on the Fourier plane, the photorefractive effect will saturate, so that there occurs a tendency in that a nonlinear distortion is introduced in a recorded image. The optical systems constituting the apparatus may be positioned such that the reference and signal light beams interfere with each other in front of or behind the Fourier plane to carefully avoid the problem of nonlinear distortion.

The cylindrical volume holographic memory 10 is disposed on a moving portion for moving the cylindrical volume holographic memory 10 at a predetermined interval pitch in the direction of its optical crystallographic axis, as well as for rotating the cylindrical volume holographic memory 10 about the axis of rotational symmetry at a predetermined angle pitch, e.g., it is a vertical movement and rotation mechanism. The vertical movement and rotation mechanism comprises a driver 19, and a vertical movement mechanism 19b coupled to the driver 19 and having a rotating table 19a. The driver 19 is controlled by the controller 20 to rotate and vertically move the table 19a.

The volume holographic memory 10 is placed on the table 19a such that its crystal optical axis 9 matches the axis of rotation of the driver 19. The rotation of the driver 19 causes the volume holographic memory 10 to move in a direction indicated by an arrow "A" in FIG. 2, and simultaneously to rotate in a direction indicated by an arrow "B" in FIG. 2. As the volume holographic memory 10 vertically moves in the direction of the arrow "A", a recording position of interference fringes created by the reference and signal light beams within the volume holographic memory 10 is shifted in the direction of the arrow "A", thereby realizing spatial multiplexing recording. Also, as the volume holographic memory 10 rotates in the direction of the "B" together with the table 19a, a recording surface of an interference pattern rotates, thereby realizing angle multiplexing recording and spatial multiplexing recording.

While this embodiment shows a moving mechanism for simultaneously performing the angle multiplexing recording and the spatial multiplexing recording, it is also possible to use only one of the mechanism for vertical movements of the volume holographic memory 10 along the crystal optical axis (in the direction of the arrow "A") or the mechanism for rotation of the volume holographic memory 10 (in the direction of the arrow "B") to perform only one multiplexing recording.

Also, in place of the vertical movement and rotation mechanism, it is possible to employ a moving mechanism which can be separately controlled to move the volume holographic memory 10 in the direction of the crystal optical axis and to rotate the volume holographic memory 10. For example, a supersonic motor or the like may be used for rotating the volume holographic memory 10, while a separate uniaxial moving stage may be used for moving the volume holographic memory 10 in the direction of the crystal optical axis.

During reproduction, on the other hand, the volume holographic memory 10, which has been recorded in the aforementioned manner, is mounted on the rotation mechanism, as it is during recording. After that, only the reference light beam from the mirror 18 is allowed to impinge on the volume holographic memory 10 by closing the shutter 6a and turning off the super-luminescent diode 30 under the control of the controller 20. Then, diffraction light diffracted from the interference fringes recorded in the volume holographic memory 10 is made incident as a reproduced light beam on the CCD 22 through the inverse Fourier transform lens 21 to form a reproduced image. The CCD 22 has a two-dimensional light receiving surface made up of 480×640 pixels similarly to the spatial light modulator 12. The CCD 22 transduces the reproduced light received thereby to an electric signal which is output to a decoder 26. The decoder 26 compares the input electric signal with a predetermined slice level, and outputs binary digital data.

As described above, the foregoing embodiment accomplishes the so-called two-color holographic memory system, in which the gate light beam of the second wavelength different from the first wavelength of the signal and reference light beams is introduced into the volume holographic memory for increasing the photo-sensitivity thereof, while the signal and reference light beams are irradiated to the volume holographic memory, so that interference fringes are recorded at a site in which the signal and reference light beams as well as the gate light beam intersect with each another.

The two-color holographic memory system can eliminate the defect of the conventional so-called one-color holographic memory system which employs only one laser emitting light of one wavelength as a single light source for both the signal and reference light beams, i.e., recorded information existing on respective optical paths after recording interference fringes are erased by the signal and reference light beams.

Figure 3:
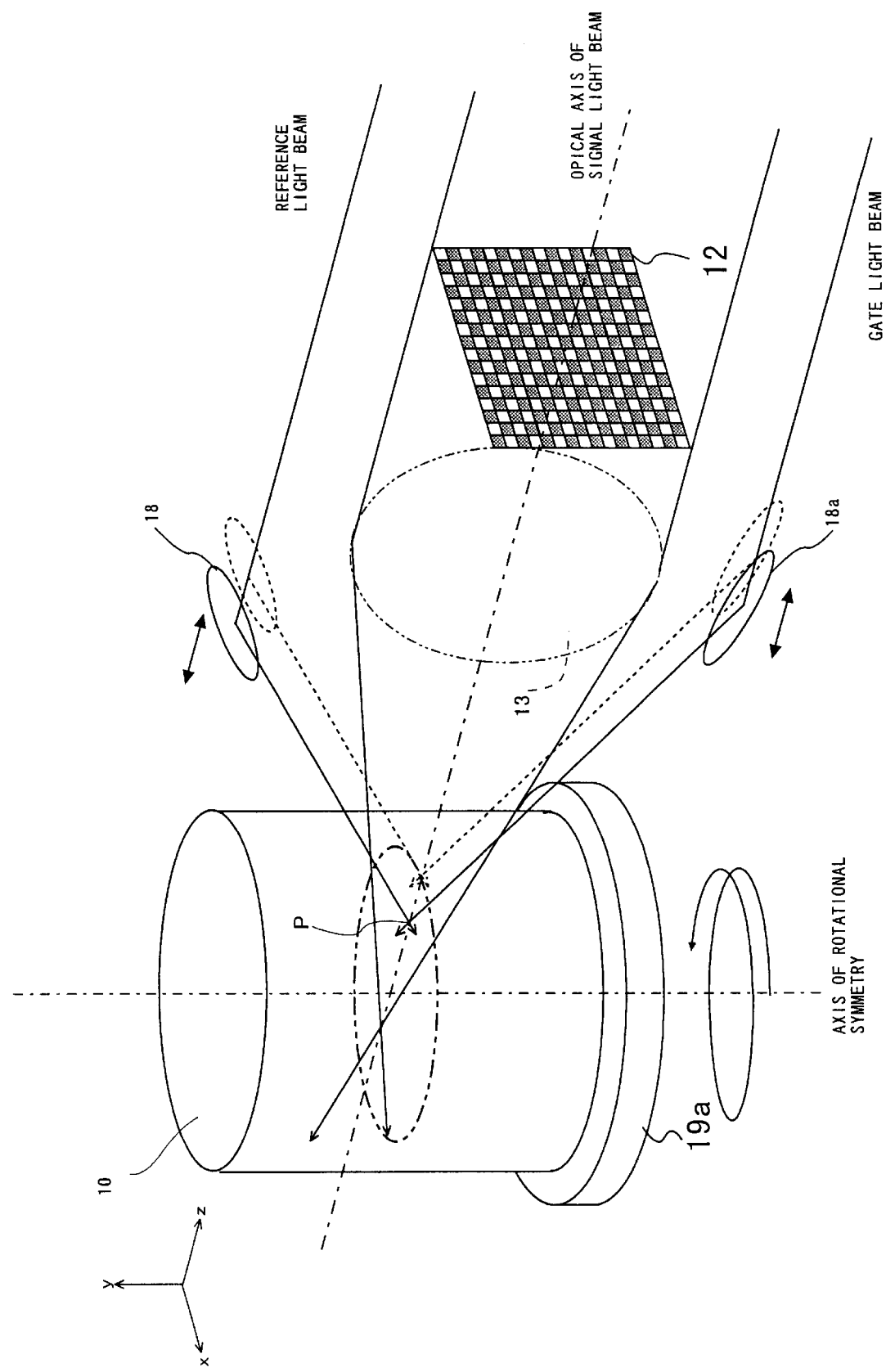
FIG. 3 is a perspective view illustrating a main portion in an optical information recording and reproducing apparatus according to the present invention which is equipped with a cylindrical volume holographic memory.

In the two-color holographic memory system employing a cylindrical rotary volume holographic memory, signals are sequentially recorded in a portion in which the gate, reference and signal light beams intersect together within the volume holographic memory. For example, as illustrated in FIG. 3, after recording has been completed for an angle range of 360 degrees or one turn of the outermost circle of the cylindrical volume holographic memory 10 (indicated by a two-dot chain line), the reflective movable mirrors 18, 18a associated with the reference and gate light beams are simultaneously moved in the depth direction (z-direction), and the reference and gate light beams are scanned to move a recording position "P" in the intersecting region one step toward the inside. Then, recording is performed for the angle range of 360 degrees or one turn as is the case of the outermost circle. By repeating this operation, information is spatially recorded in the form of concentric circles in one layer of the rotary volume holographic memory. In this event, the rotation of the volume holographic memory may be synchronized with the scanning of the reference light beam and the gate light beam to perform spiral recording.

Figure 4:
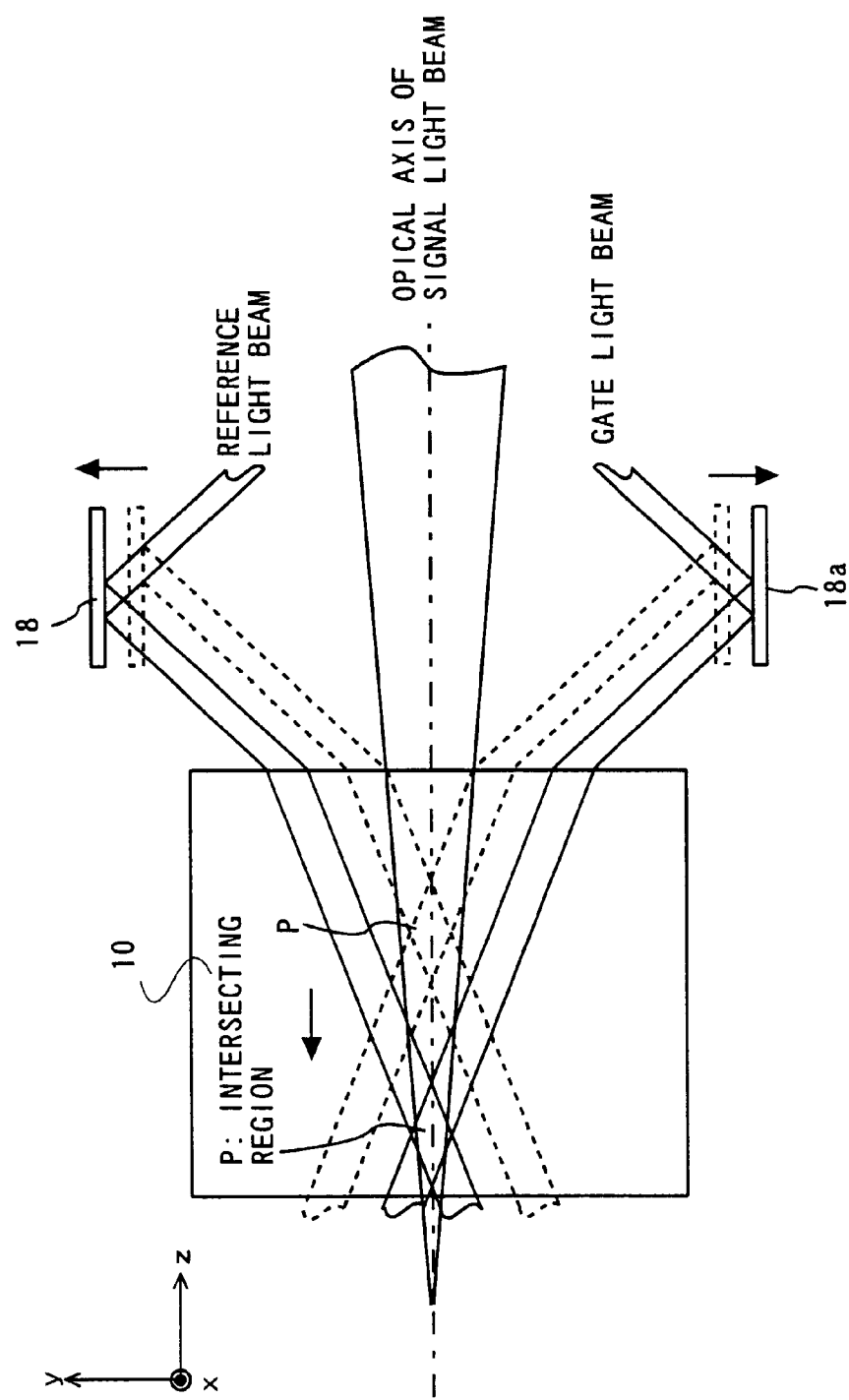
FIGS. 4 through 8 are side views each illustrating a main portion of the volume holographic memory system according to another embodiment of the present invention.
Figure 5:
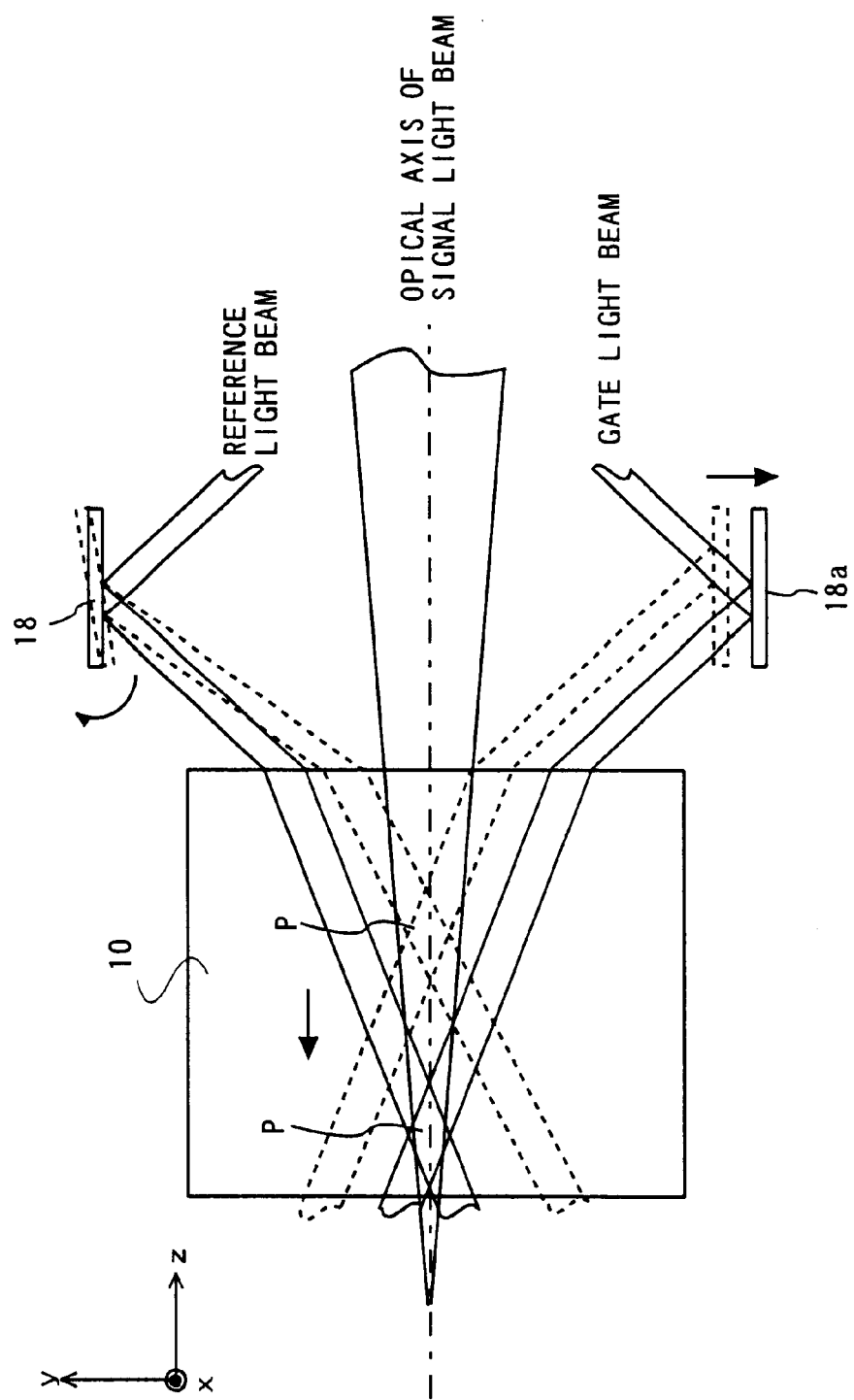
Figure 6:
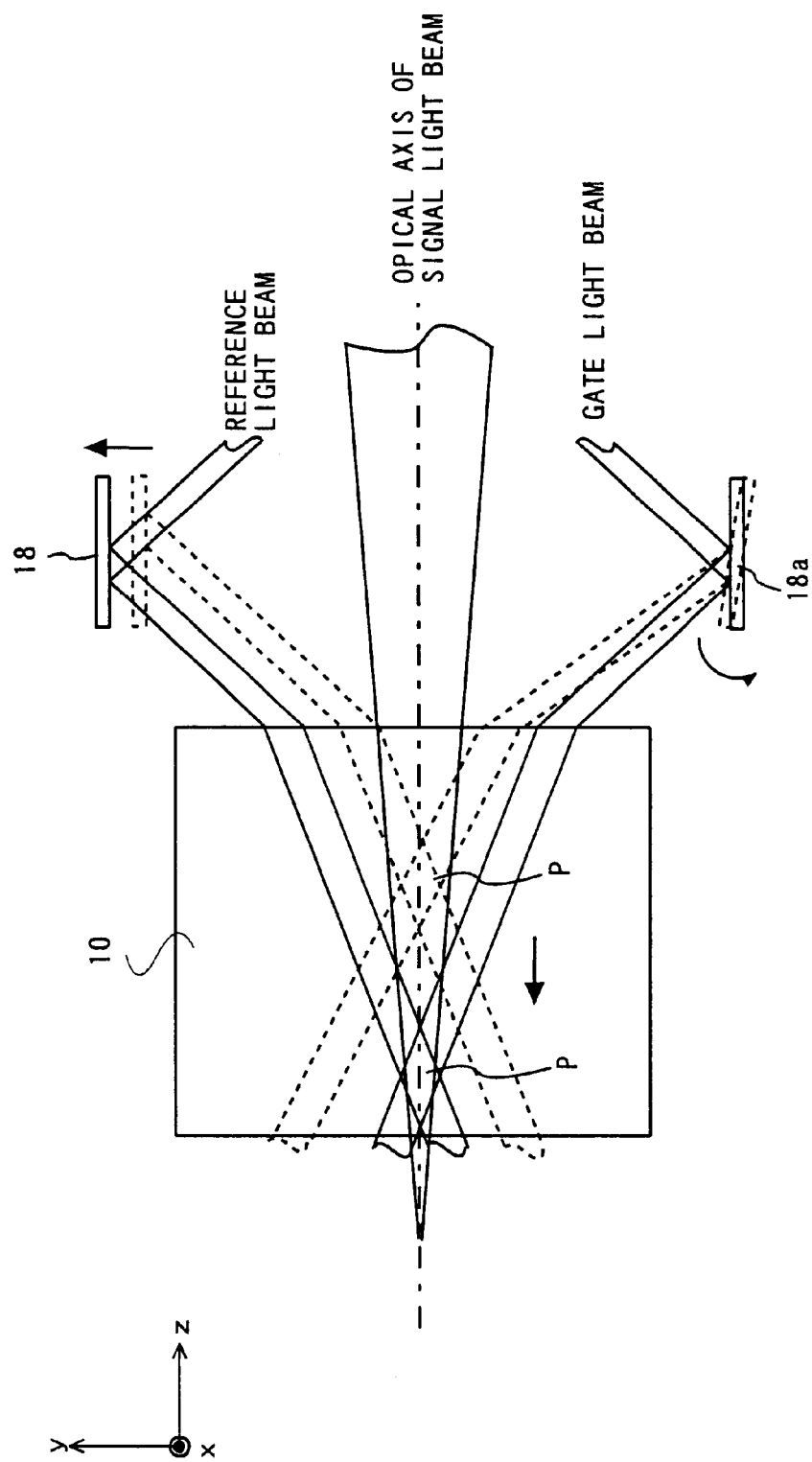
Figure 7:
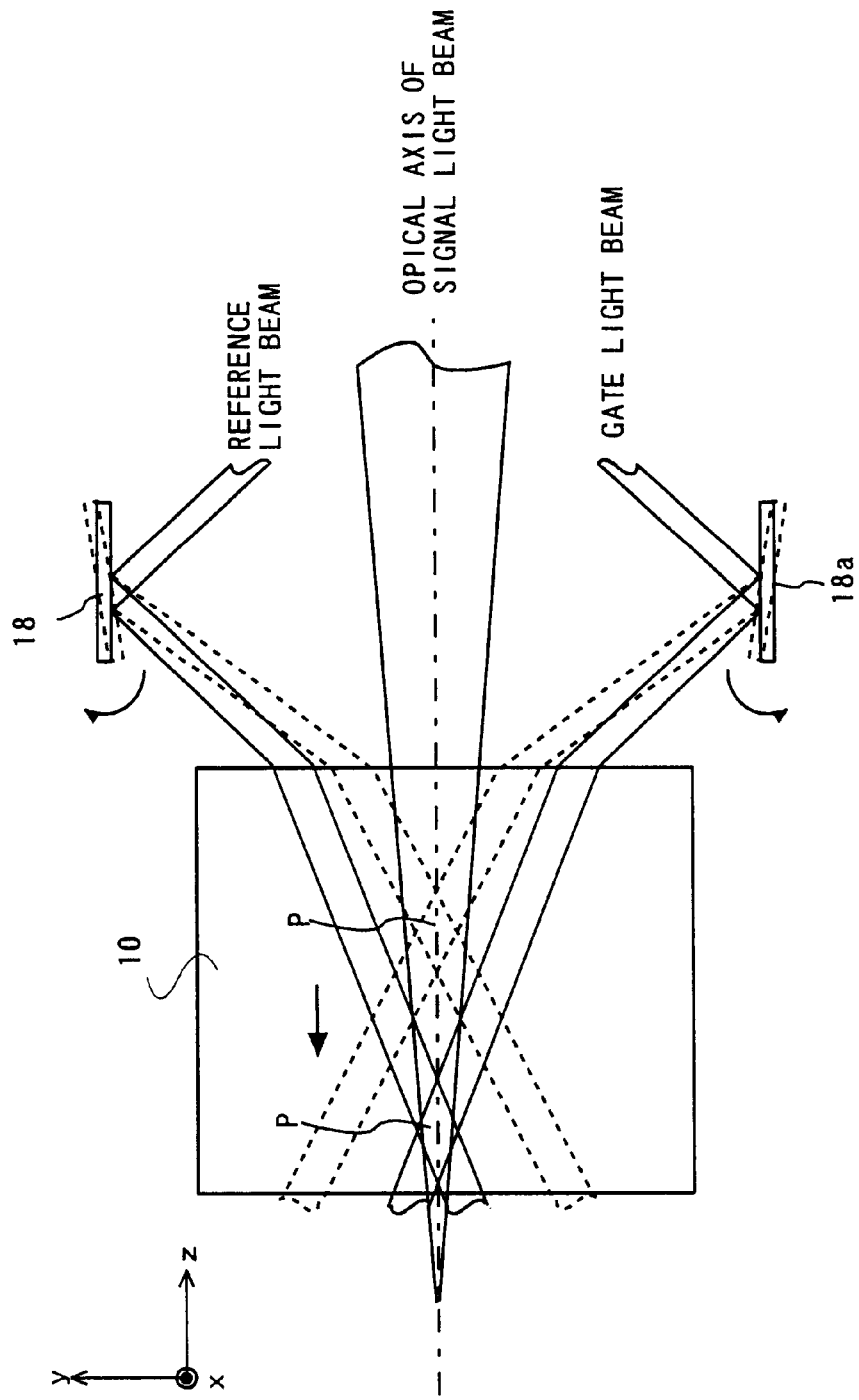

In addition to the configuration shown in FIG. 3, there are methods of scanning the reflective movable mirrors 18 and 18a for moving the intersecting region "P", in which the gate and reference light beams intersect with each other, along the optical axis of the optical path of the signal light beam within the volume holographic memory, as follows: The intersecting region "P" may be transferred in such a manner that both the mirrors 18 and 18a are simultaneously displaced parallel to each other as illustrated in FIG. 4. Alternatively, the intersecting region "P" may be transferred in such a manner that the reflective movable mirror 18 for the reference light beam is pivoted while the reflective movable mirror 18a for the gate light beam is displaced parallel as illustrated in FIG. 5. In addition, the intersecting region "P" may be transferred in such a manner that the reflective movable mirror 18 for the reference light beam is displaced parallel to each other while the reflective movable mirror 18a for the gate light beam is pivoted as illustrated in FIG. 6. Furthermore, the intersecting region "P" may be transferred in such a manner that both the mirrors are pivoted as illustrated in FIG. 7. Any of these scanning methods may be employed.

It should be noted however that when the reflective movable mirror 18 for the reference light beam is pivoted to form an angular difference with the reference light beam with respect to the preceding and subsequent rotations of the volume holographic memory, the angle multiplexing component can be more effectively utilized. Since the spacing between respective rotations can be narrower, the recording density can be increased.

During reproduction, only the reference light beam may be directed to the volume holographic memory in the same way as the recording to retrieve a reproduced signal.

Figure 8:
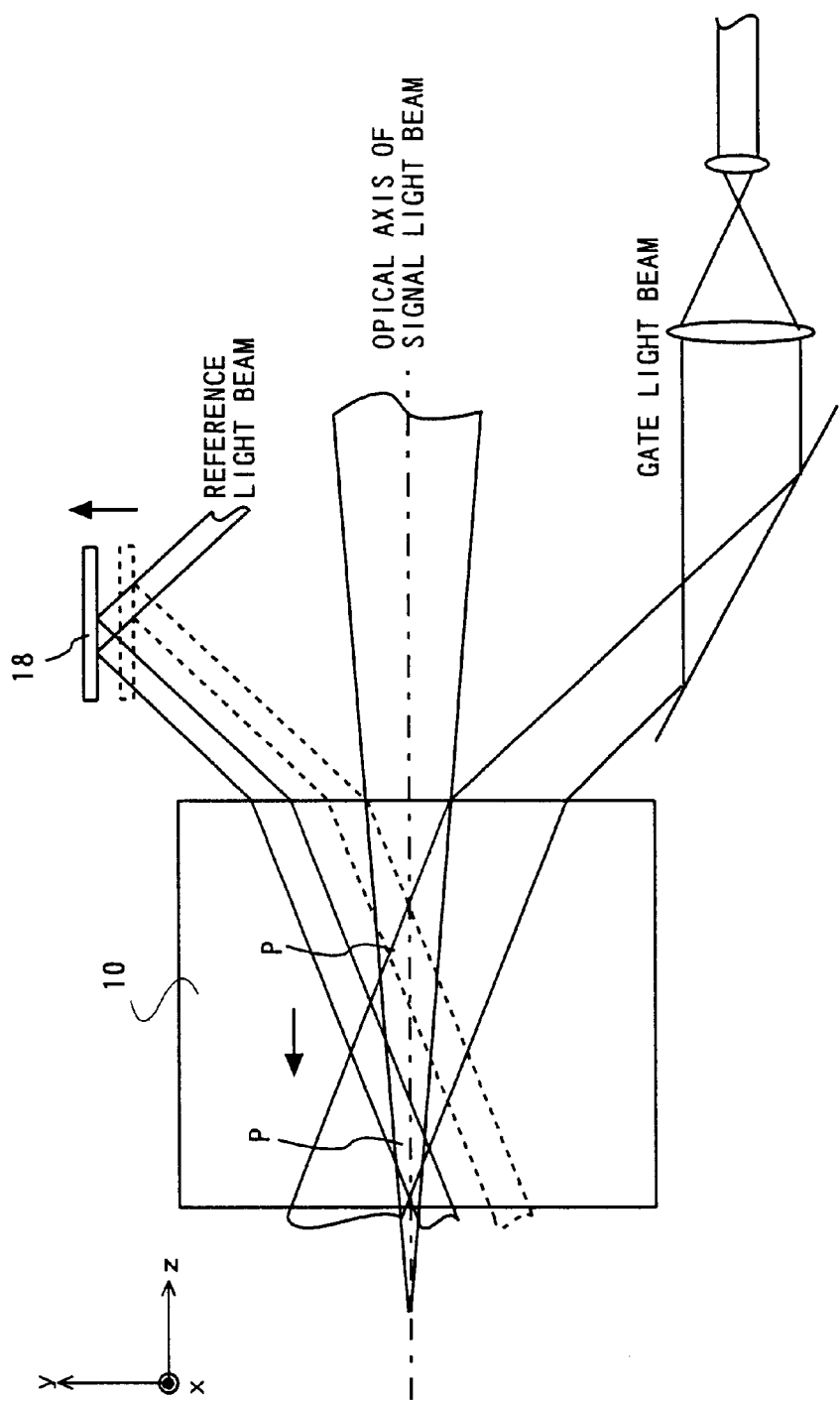

There is another method of moving or scanning the intersecting region, in which the gate and reference light beams intersect with each other, along the optical axis of the optical path of the signal light beam within the volume holographic memory. That is, as illustrated in FIG. 8, the reflective movable mirror 18a for the gate light beam is removed from the apparatus, but the gate light beam is widened, instead. The reflective movable mirror 18 for the reference light beam is only provided to scan the reference light beam by pivotal movement or parallel displacement of the reflective movable mirror 18 for the reference light beam. In this case, a similar effects to the above embodiment can be produced.

As mentioned above, the two-color hologram is characterized in that previously recorded information is not erased during reproduction, unlike the one-color hologram. In the structure illustrated in FIG. 8, however, previously recorded data is partially erased during subsequent recording, as is the case with the one-color hologram.

Thus, when two of the three light beams impinge on a previously recorded circular portion during the next rotational recording, a recording scheduling, generally used for angle multiplexing recording, is conducted for each rotation to maximally effectively utilize the recording performance. In multiplexing recording of index gratings using the photorefractive effect, previously recorded index gratings are gradually erased by subsequent multiplexing recording. An attenuation coefficient for this erasure is called the "erasure time constant." It is necessary to previously measure the erasure time constant for a volume holographic memory used for recording. From the erasure time constant, the relation of recording time depending on the recording order is determined. This is called the "scheduling." By performing multiplexing recording in accordance with the scheduling, a reproduced image having a constant brightness can be ensured.

Figure 9:
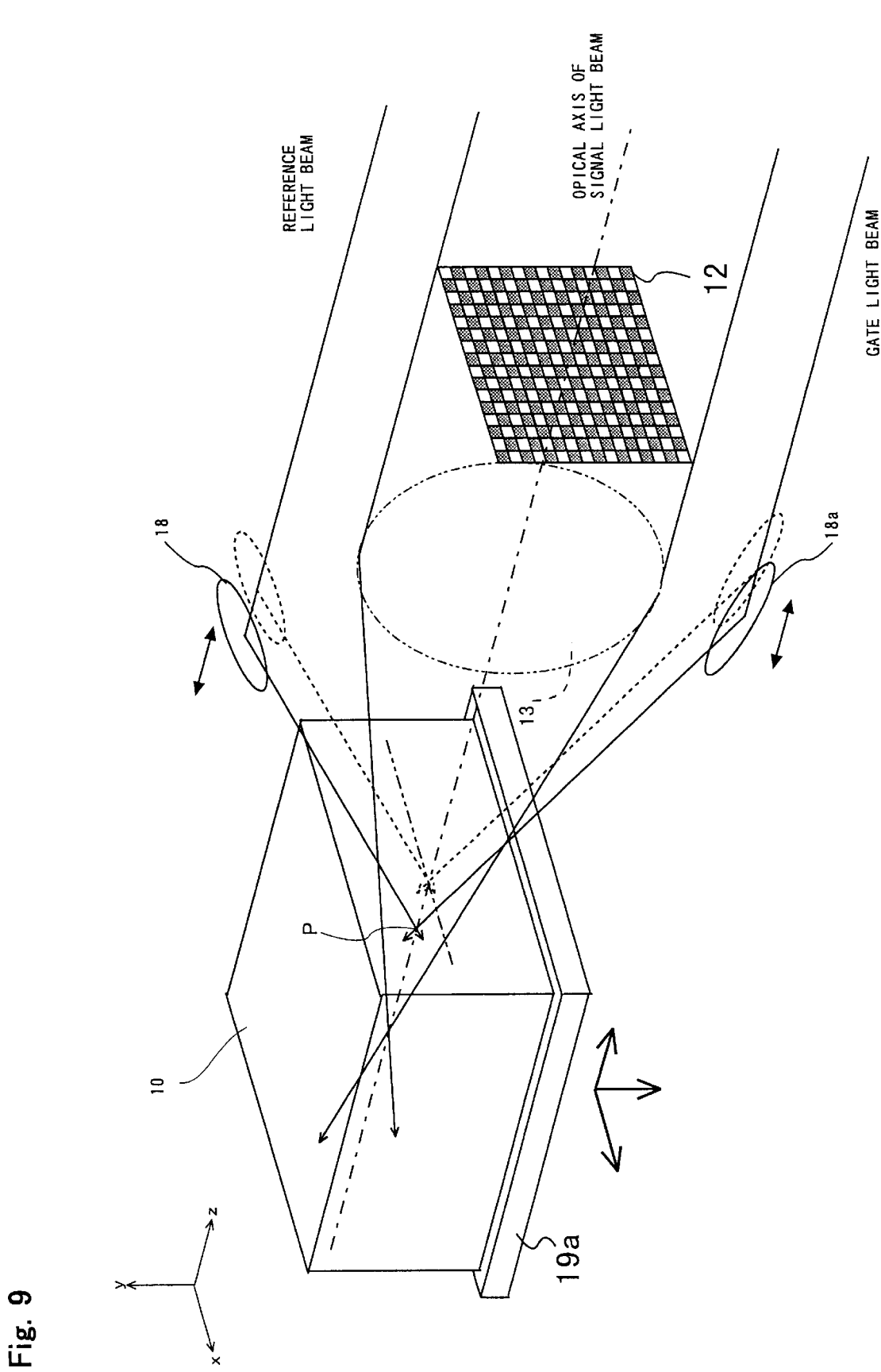
FIG. 9 is a perspective view illustrating a main portion of the optical information recording and reproducing apparatus according to another embodiment of the present invention which is equipped with a rectangular volume holographic memory.

Further, as another embodiment, FIG. 9 illustrates a structure which uses a rectangular volume holographic memory 10, and permits the volume holographic memory 10 to move parallel in the x-, y- and z-directions independently. On a first layer in the volume holographic memory 10, a table 19a is controlled by the controller 20 to move the memory in the horizontal direction (x-direction) at the same height. Next, a reflective movable mirror 18 for reference light beam and a reflective movable mirror 18 for gate light beam are simultaneously moved in synchronism in the depth direction (z-direction) to scan reference light beam and gate light beam, causing a recording position "P" to move one step toward the inside for a second layer in the volume holographic memory 10. To repeat these operations provides a similar recording effect to the above embodiment.

As described above, according to the present invention, since the optical information recording and reproducing apparatus has the mechanism for moving the intersecting region, in which the gate and reference light beams intersect with each other, along the optical axis of the optical path of the signal light beam within the volume holographic memory, high density recording can be accomplished in the depth direction of the volume holographic memory.

What is claimed is:

1. An optical information recording/reproducing apparatus for recording data on a volume holographic memory formed of a photorefractive crystal and reproducing data from the volume holographic memory, said apparatus comprising:

a support portion for detachably supporting a volume holographic memory;

a reference light beam supplying portion for supplying a coherent reference light beam of a first wavelength into the volume holographic memory;

a signal light beam supplying portion for supplying a coherent signal light beam of the first wavelength, which is modulated in accordance with image data, into the volume holographic memory such that said coherent signal light beam intersects with the reference light beam to produce an optical interference pattern with said reference and signal light beams;

a gate light beam supplying portion for supplying a gate light beam of a second wavelength into the volume holographic memory, the gate light beam enhancing a photo-sensitivity of the volume holographic memory for one of activating and deactivating of a refractive index grating in accordance with the presence or absence of said optical interference pattern;

a photo-detecting portion for detecting a diffracted light caused from the refractive index grating of the volume holographic memory by irradiation of the reference light beam; and a scanning portion for moving an intersecting region in which the gate light beam, the signal light beam and the reference light beam intersect with one another within the volume holographic memory along an optical axis of an optical path of the signal light beam within the volume holographic memory, said scanning portion including:

a first movable mirror positioned on an optical path of the reference light beam to reflect and move the reference light beam to the intersecting region;

a second movable mirror positioned on an optical path of the gate light beam to reflect and move the gate light beam to the intersecting region; and a controller for moving said first and second movable mirrors associated with each other so as to move the intersecting region in which the gate light beam and the reference light beam intersect with each other within the volume holographic memory along an optical path of the signal light beam within the volume holographic memory.

2. An apparatus according to claim 1, wherein said controller synchronously moves said first and second movable mirrors to move the intersecting region.

3. An apparatus according to claim 1, wherein said gate light beam supplying portion includes a super-luminescent diode.

4. An apparatus according to claim 1, wherein the volume holographic memory includes a cylindrical body made of a uniaxial crystal having an optical crystallographic axis in parallel with an axis of rotational symmetry, and said apparatus further comprises a scanning portion for moving the cylindrical body in a direction of the optical crystallographic axis, and for rotating the cylindrical body about the axis of rotational symmetry.

5. An apparatus according to claim 1, wherein the volume holographic memory is a rectangular solid made of a uniaxial crystal having an optical crystallographic axis in parallel with one surface thereof, and said apparatus further comprises a moving portion for moving the volume holographic memory in parallel with respect to the signal light beam.

6. An apparatus according to claim 1, wherein said first and second movable mirrors are displaceable mirrors in a translational motion along the optical path of the signal light beam and said controller makes said first and second movable mirrors simultaneously move in a same direction and parallel to each other.

7. An apparatus according to claim 1, wherein said first and second movable mirrors are displaceable mirrors in a translational motion along a line perpendicular to the optical path of the signal light beam and said controller makes said first and second movable mirrors simultaneously move in an opposite direction to each other.

8. An apparatus according to claim 1, wherein one of said first and second movable mirrors is a displaceable mirror in a translational motion along a line perpendicular to the optical path of the signal light beam and the other of said first and second movable mirrors is a pivotable mirror and said controller simultaneously drives said first and second movable mirrors in such a manner that the intersecting region of the gate light beam and the reference light beam moves along the optical path of the signal light beam.

9. An apparatus according to claim 1, wherein said first and second movable mirrors are pivotally movable mirror about lines perpendicular to and away from the optical path of the signal light beam respectively and said controller simultaneously drives said first and second movable mirrors in such a manner that the intersecting region of the gate light beam and the reference light beam moves along the optical path of the signal light beam.

* * * * *

UNITED STATES PATENT AND TRADEMARK OFFICE
CERTIFICATE OF CORRECTION

PATENT NO. : 6,320,683 B1
DATED : November 21, 2001
INVENTOR(S) : Ito et al.

It is certified that error appears in the above-identified patent and that said Letters Patent is hereby corrected as shown below:

<u>Title page,</u>
Item [57], ABSTRACT,
Lines 13-14, "to enhances" should read -- to enhance --.

<u>Column 10,</u>
Line 44, "pivotally movable mirror" should read -- pivotally movable mirrors --.

Signed and Sealed this

Twenty-fourth Day of September, 2002

Attest:

*Attesting Officer*

JAMES E. ROGAN
*Director of the United States Patent and Trademark Office*